US012779998B2

(12) United States Patent
Nagayama et al.

(10) Patent No.: US 12,779,998 B2
(45) Date of Patent: Nov. 3, 2026

(54) STATE QUANTITY DISPLAY SYSTEM AND WORK VEHICLE

(71) Applicant: Kubota Corporation, Osaka (JP)

(72) Inventors: Takashi Nagayama, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 19 days.

(21) Appl. No.: 18/969,451

(22) Filed: Dec. 5, 2024

(65) Prior Publication Data

US 2025/0196643 A1 Jun. 19, 2025

(30) Foreign Application Priority Data

Dec. 14, 2023 (JP) ................................ 2023-211083

(51) Int. Cl.

*B60K 35/29* (2024.01)
*B60K 35/10* (2024.01)
*B60K 35/22* (2024.01)
*B60K 35/28* (2024.01)

(52) U.S. Cl.

CPC ............. *B60K 35/28* (2024.01); *B60K 35/10* (2024.01); *B60K 35/22* (2024.01); *B60K 35/29* (2024.01); *B60K 2360/151* (2024.01); *B60K 2360/168* (2024.01); *B60Y 2200/223* (2013.01)

(58) Field of Classification Search

CPC .......... B60K 2360/61; B60K 2360/151; B60K 2360/1515; B60K 2360/161; B60K 2360/162; B60K 2360/168; B60K 2360/178; B60Y 2200/223

See application file for complete search history.

(56) References Cited

U.S. PATENT DOCUMENTS 4,442,424 A * 4/1984 Shirasaki ............ G07C 5/0816 340/521
5,374,917 A * 12/1994 Hoffman ............. G07C 5/0825 340/459
6,320,497 B1 * 11/2001 Fukumoto ........... B60K 35/654 701/32.7
6,441,726 B1 * 8/2002 Voto ........................ B60Q 3/14 340/459

(Continued)

FOREIGN PATENT DOCUMENTS

EP 1841649 B1 8/2008
EP 3239046 A1 11/2017
JP 2017149314 A 8/2017

*Primary Examiner* — Dino Kujundzic
(74) *Attorney, Agent, or Firm* — The Webb Law Firm

(57) ABSTRACT

A state quantity display system for displaying a quantity of a state of a work vehicle includes a detection value receiver 51 configured to receive information on a detection value of a state quantity of each of a plurality of components of a work vehicle; a limit value manager 72 configured to manage at least one limit value associated with the state quantity; an urgency degree calculator configured to normalize the detection value based on the at least one limit value to calculate a notification-urgency degree; and a display controller 74 configured to select from among the detection values a first detection value for which the notification-urgency degree is highest and cause a state quantity display section 80 to display the first detection value.

7 Claims, 6 Drawing Sheets

(56) References Cited

U.S. PATENT DOCUMENTS

| | | | | |
|---|---|---|---|---|
| 6,721,634 | B1 * | 4/2004 | Hauler | B60K 35/60 701/1 |
| 7,228,505 | B2 * | 6/2007 | Shimazu | E02F 9/26 701/99 |
| 2013/0035824 | A1 * | 2/2013 | Nakamura | B60K 35/81 701/36 |
| 2014/0246537 | A1 * | 9/2014 | Oltheten | B64C 27/008 244/17.11 |
| 2016/0202891 | A1 * | 7/2016 | Hasedzic | B60R 1/31 715/771 |
| 2016/0265196 | A1 * | 9/2016 | Shimizu | B60K 35/10 |
| 2017/0203661 | A1 | 7/2017 | Nishinaka et al. | |
| 2021/0103367 | A1 * | 4/2021 | Havins | G06F 3/0481 |
| 2021/0237576 | A1 * | 8/2021 | Jahns | B60K 35/10 |
| 2021/0331590 | A1 * | 10/2021 | Nishimura | B60K 35/60 |

* cited by examiner

STATE QUANTITY DISPLAY SYSTEM AND WORK VEHICLE

CROSS-REFERENCE TO RELATED APPLICATION

This application claims priority to Japanese Patent Application No. 2023-211083 filed Dec. 14, 2023, the disclosure of which is hereby incorporated by reference in its entirety.

BACKGROUND OF THE INVENTION

Field of the Invention

The present invention relates to a state quantity display system for displaying the quantity of a state of a work vehicle and to a work vehicle including the state quantity display system.

Description of Related Art

Meter panels including a liquid crystal or seven-segment display are known as a display device for displaying the quantity of any of such states of a work vehicle as the respective temperatures of cooling water, electric devices, and hydraulic devices, the number of revolutions of the engine, and the amount of remaining fuel.

JP 2017-149314 A (see FIG. 5) discloses a display device including a liquid crystal display including a vehicle speed display section, a gear display section, a total display section, a number-of-revolutions display section, a temperature display section, and a remaining fuel display section. The vehicle speed display section displays the vehicle speed with two seven-segment digits. The gear display section displays the current position of the shift lever with a single 14-segment character. The total display section displays the total distance traveled or total length of time of the operation of the engine with six seven-segment digits. The number-of-revolutions display section displays the number of revolutions of the engine with four seven-segment digits. The temperature display section displays the temperature of engine cooling water with a seven-segment bar. The remaining fuel display section displays the amount of remaining fuel with a seven-segment bar.

The display device disclosed in JP 2017-149314 A may be capable of displaying the respective quantities of many states of a work vehicle. The display device, however, requires a large display area, and is unsuitable for a small-sized work vehicle with only a limited area available for information display.

SUMMARY OF THE INVENTION

In view of the above circumstances, there has been a demand for a state quantity display system mountable in a work vehicle with only a limited area available for information display and configured to allow the driver to recognize the quantity of a state with a high degree of urgency.

A state quantity display system according to the present invention for displaying a quantity of a state of a work vehicle includes: a detection value receiver configured to receive information on a detection value of a state quantity of each of a plurality of components of a work vehicle; a limit value manager configured to manage at least one limit value associated with the state quantity; an urgency degree calculator configured to normalize the detection value based on the at least one limit value to calculate a notification-urgency degree; and a display controller configured to select from among the detection values a first detection value for which the notification-urgency degree is highest and cause a state quantity display section to display the first detection value.

With the above configuration, the urgency degree calculator calculates a notification-urgency degree from a detection value of each of two or more state quantities and at least one limit value associated with the state quantity. The notification-urgency degree indicates the level of importance of whether the driver should be notified of the state quantity. The display controller causes the state quantity display section to display the detection value of the state quantity with the highest notification-urgency degree and not display the detection value of a state quantity with a low notification-urgency degree. The above configuration thereby advantageously uses only a small display area for the state quantity display section and reduces the trouble for the driver in checking the display. Further, the urgency degree calculator normalizes the detection value on the basis of the at least one limit value to calculate a substantially standardized degree of urgency. This facilitates the driver comparing different degrees of urgency even if the relation between the detection value of a state quantity and at least one limit value varies according to the state quantity.

State quantities related to device temperature and operation (for example, speed) to be checked are each typically divided into a caution level and a warning level. The caution level does not lead to a stop of the work vehicle, whereas the warning level does lead to a stop of the work vehicle. The caution and warning levels vary according to the state quantity and should preferably be referred to in the calculation of the notification-urgency degree. The state quantity display system may thus be configured such that the at least one limit value includes a first limit value for a functional limitation of the component and a second limit value for a stop of the component, and the urgency degree calculator calculates the notification-urgency degree with use of a function involving the detection value as a variable and the first limit value and the second limit value as constants.

The state quantity display section should, in displaying the detection value of a state quantity, advantageously indicate the relation between a first limit value for the state quantity (for example, the caution level) and a second limit value for the state quantity (for example, the warning level) to facilitate the driver expecting what may happen in the future. The state quantity display system may thus be configured such that the display controller causes the state quantity display section to display the first detection value in a graphic form indicative of a relation between the detection value and the first limit value and a relation between the detection value and a second limit value.

Displaying a state quantity such as temperature and speed in a gauge chart facilitates the driver recognizing the state quantity. Further, the gauge chart includes two or more ranges for displaying a value (for example, a low-temperature range and a high-temperature range) that are easily usable as ranges defined by the first and second limit values as particular values (stated differently, a range up to the first limit value and a range from the first limit value to the second limit value). The state quantity display system may thus be configured such that the graphic form is a gauge chart including a first range and a second range, the first range extending to the first limit value and having a first color, the second range extending from the first limit value to the second limit value and having a second color different from the first color.

The driver of a work vehicle, in particular an electric work vehicle, should pay particular attention to the respective temperatures of a battery, a motor, an inverter, a cooler, and a hydraulic device as state quantities. The state quantity display system may thus be configured such that the plurality of components include at least two of a battery, a motor, an inverter, a cooler, and a hydraulic device, and the state quantity is a temperature of each of the at least two components.

The present invention covers not only the state quantity display system described above, but also a work vehicle including the state quantity display system.

DESCRIPTION OF THE INVENTION

Unless otherwise stated, the present specification uses (i) the word "forward" to refer to the front side in the front-back direction (traveling direction) of the vehicle, (ii) the word "backward" to refer to the back side in the front-back direction of the vehicle, (iii) the terms "left-right direction" and "lateral direction" to refer to the transverse direction (width direction) of the vehicle, which is orthogonal to the front-back direction of the vehicle, and (iv) the words "upward" and "downward" to refer to a position in the vertical direction of the vehicle, that is, a height from the ground. The drawings show "F" to indicate "forward", "B" to indicate "backward", "L" to indicate "left", "R" to indicate "right", "U" to indicate "upward", and "D" to indicate "downward".

Figure 1:
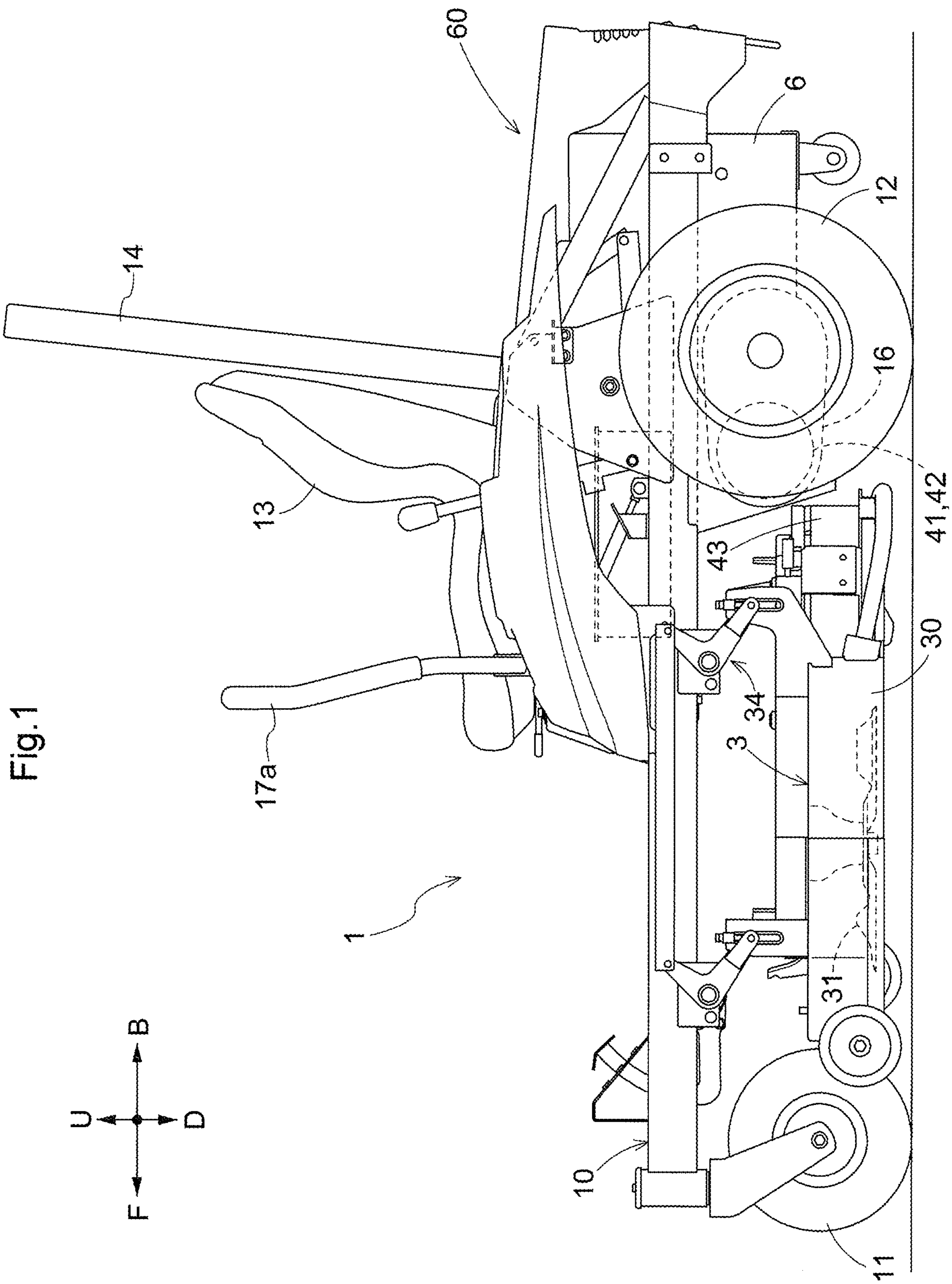
FIG. 1 is a side view of an electric mower in its entirety as an example work vehicle.
Figure 2:
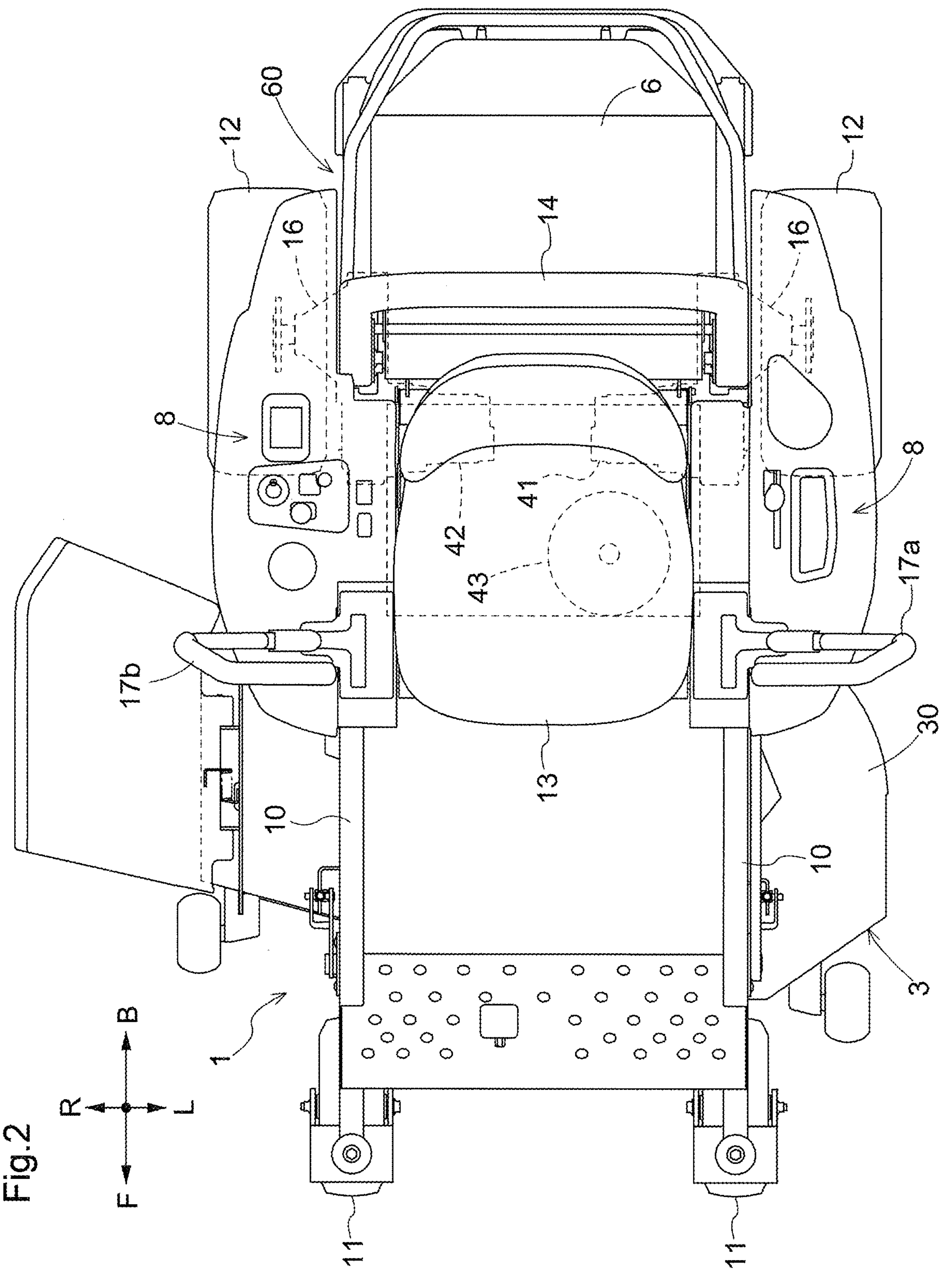
FIG. 2 is a plan view of an electric mower in its entirety.

The description below deals with a work vehicle as an embodiment of the present invention, the work vehicle being an electric mower (hereinafter referred to as "work vehicle"). The work vehicle, as illustrated in FIGS. 1 and 2, includes a body 1, a pair of left and right front wheels 11, a pair of left and right rear wheels 12, and a mower device 3. The front wheels 11 are held by a front portion of the body 1. The rear wheels 12 (drive wheel unit) are held by a back portion of the body 1. The mower device 3 (work device) is held by a lower portion of the body 1 between the front wheels 11 and the rear wheels 12. The work vehicle also includes a battery 6 and a device container 60 disposed between the left and right rear wheels 12 and containing components such as the battery 6. The body 1 is also provided with components such as a driver's seat 13 and a roll-over protective structure (ROPS) frame 14.

The body 1 includes a frame 10 including a pair of left and right longitudinal beams extending in the front-back direction and a cross beam coupling the two longitudinal beams to each other. The ROPS frame 14 has lower ends coupled to the frame 10.

The front wheels 11 are caster wheels, whereas the rear wheels 12 are drive wheels. The work vehicle includes a left travel motor 41 and a right travel motor 42 (travel electric motor). The left and right travel motors 41 and 42 are disposed inward of the respective rear wheels 12 and configured to transmit motive power to the respective rear wheels 12 through respective deceleration mechanisms 16 to drive the respective rear wheels 12 independently of each other.

As illustrated in FIG. 2, the work vehicle includes a pair of left and right fenders 8 to the left and right of the driver's seat 13. The work vehicle includes a left shift lever **17*a* (vehicle speed setter) and a right shift lever 17*b* (vehicle speed setter) to the respective opposite sides of the driver's seat 13 each for use to set a desired vehicle speed. Moving the right shift lever 17*b* to the neutral position causes the right travel motor 42 to stop. Moving the right shift lever 17*b* to the forward travel side causes the right travel motor 42 to rotate to the forward travel side. Moving the right shift lever 17*b* to the backward travel side causes the right travel motor 42 to rotate to the backward travel side. Moving the left shift lever 17*a* to the neutral position, the forward travel side, or the backward travel side causes the left travel motor 41 to operate similarly to the right travel motor 42. Moving the left and right shift levers 17*a* and 17*b* drives the left and right rear wheels 12** independently of each other to the forward or backward travel side, so that the work vehicle moves forward or backward or turns to the right or left.

As illustrated in FIG. 1, the mower device 3 (which is an example work device) includes a mower deck 30 and two or more blades 31 each disposed inside the mower deck 30 and held by the mower deck 30 in such a manner as to be rotatable about a vertical axis. The work vehicle includes a mower motor 43 (which is an example of the "work electric motor") configured to drive the blades 31 (which is an example of the "rotary blade") to rotate and a link mechanism 34 suspending the mower deck 30 from the frame 10 in such a manner that the mower deck 30 is capable of being lifted and lowered.

Figure 3:
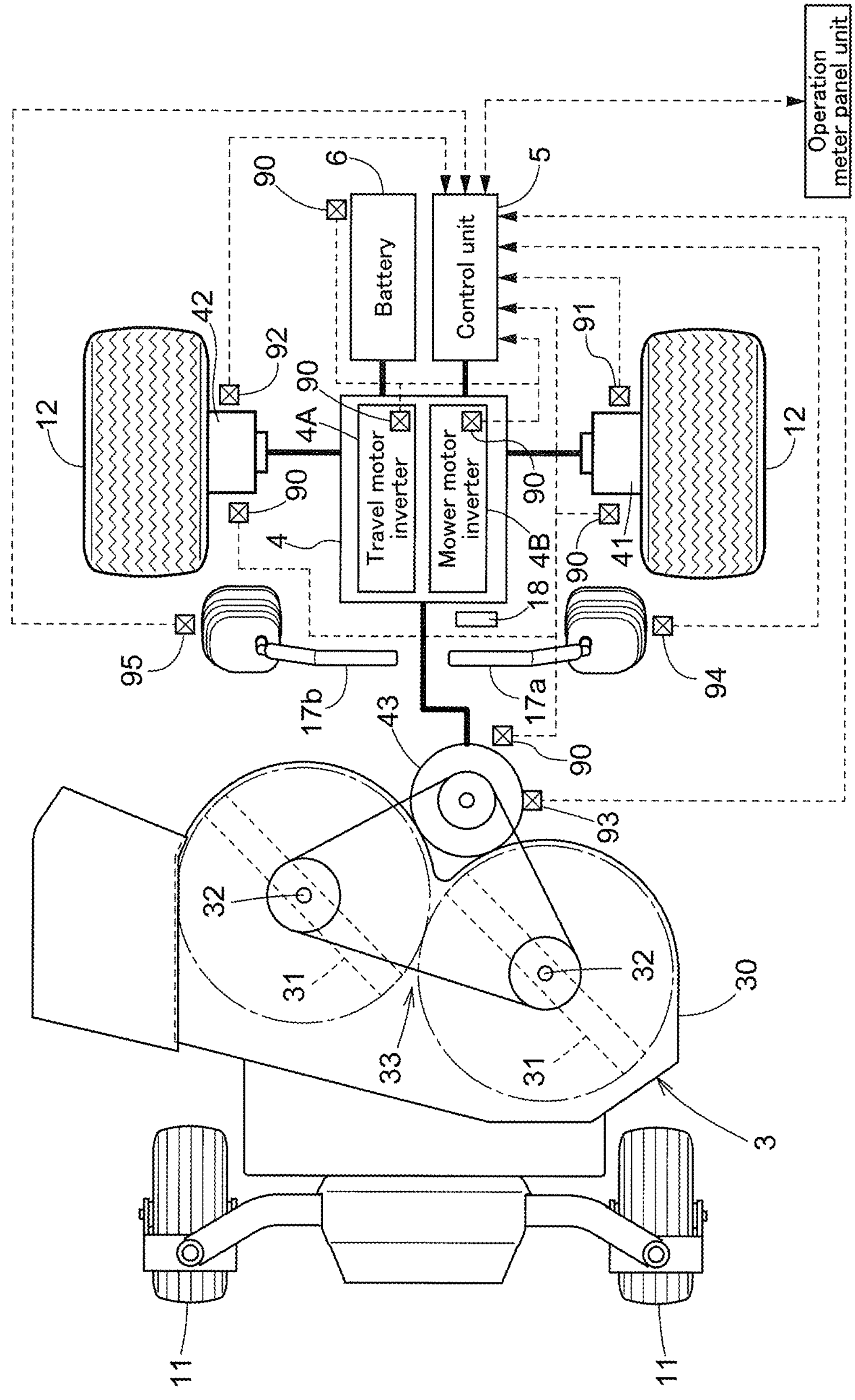
FIG. 3 is a diagram schematically illustrating the motive power system and control system of an electric mower.

FIG. 3 illustrates the power motive system and control system of the work vehicle. The mower motor 43 is attached to a back wall of the mower deck 30, and configured to rotate, with use of a belt-based power transmission mechanism 33, respective rotary shafts 32 to which the blades 31 are attached. The left travel motor 41 is configured to rotate the left rear wheel 12, whereas the right travel motor 42 is configured to rotate the right rear wheel 12.

The work vehicle includes an inverter unit 4 and a control unit 5. The inverter unit 4 is configured to feed electric power to the left and right travel motors 41 and 42 and the mower motor 43. The inverter unit 4 includes two travel motor inverters 4A configured to feed electric power to the left and right travel motors 41 and 42 and an mower motor inverter 4B configured to feed electric power to the mower motor 43. The inverter unit 4 is drivable on the basis of a control signal from the control unit 5. The inverter unit 4 is connected to the battery 6 as an electric power source. One of the travel motor inverters 4A is for the left travel motor 41, whereas the other is for the right travel motor 42.

The device container 60 contains components such as the inverter unit 4, the control unit 5, and the battery 6 as well as a cooler including a cooling fan 18 for cooling the devices contained.

Figure 4:
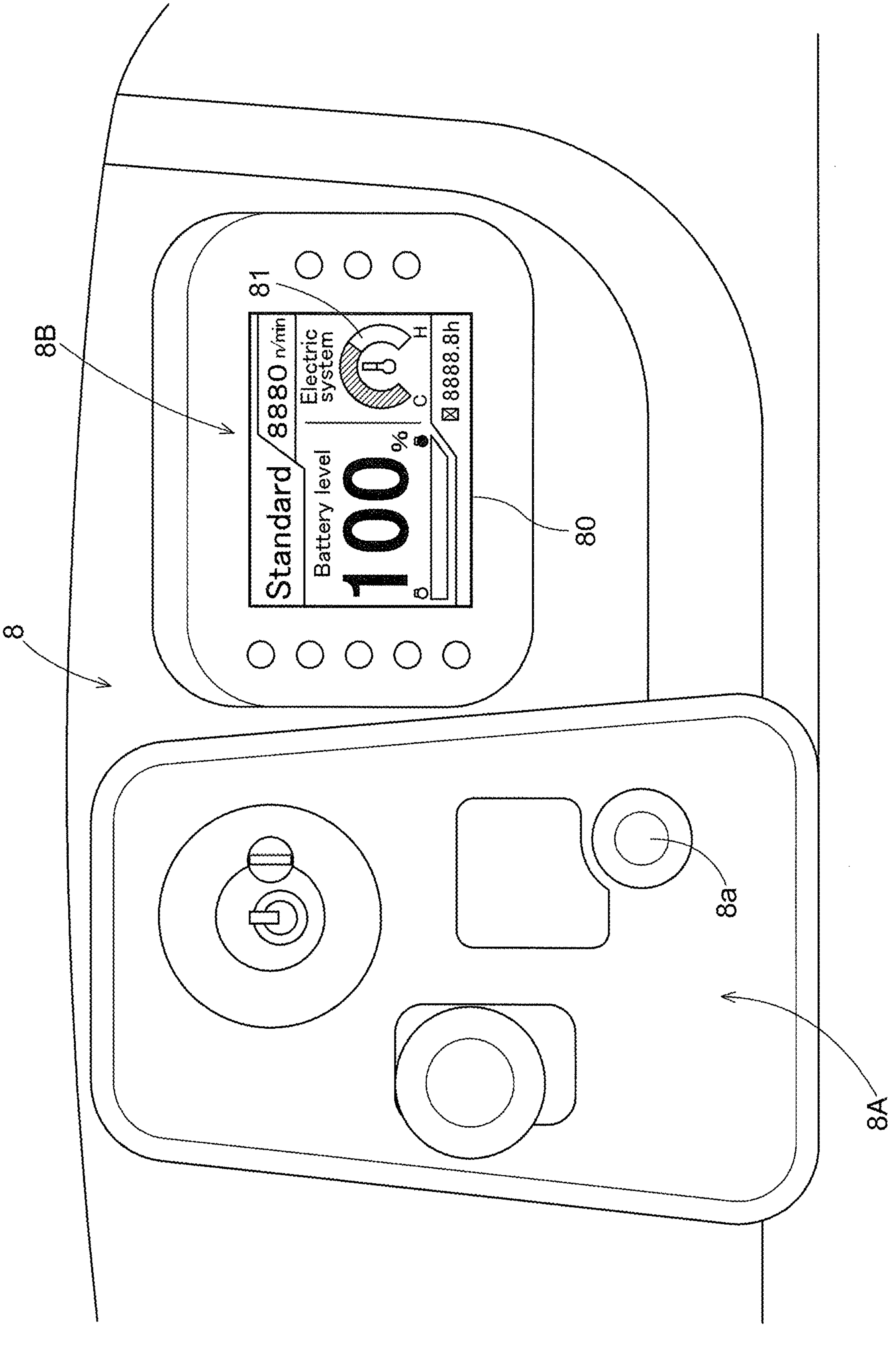
FIG. 4 is a plan view of a display panel and an operation panel.

As illustrated in FIG. 4, the right fender 8 is provided with an operation panel 8A and a display panel 8B, The display panel 8B includes a liquid crystal display 80 and a group of indicator lamps disposed to the opposite lateral sides of the liquid crystal display 80 and configured to indicate various vehicle states. The liquid crystal display 80 is configured to selectively display information on various vehicle states in the form of a numerical value, graphics, and/or the like. FIG. 4 is an example in which the liquid crystal display 80 includes at a right portion thereof a temperature display section 81 for displaying any of various temperatures in the form of a gauge chart (which is an example of the "graphic form"). The temperature display section 81 may display any of the respective temperatures of various components of the work vehicle (that is, operation devices and control devices) such as the battery 6, the left and right travel motors 41 and 42, the inverter unit 4, the mower motor 43, the cooler, and hydraulic devices as well as the air around those components. The temperature display section 81 displays a temperature under control as detailed later. The operation panel 8A includes a group of operable devices such as a switch and a dial each for use to operate an operation device mounted on the work vehicle. The group of operable devices include a manual operation member **8*a* for use to select information to be displayed on the liquid crystal display 80** and a driving mode for the work vehicle.

Figure 5:
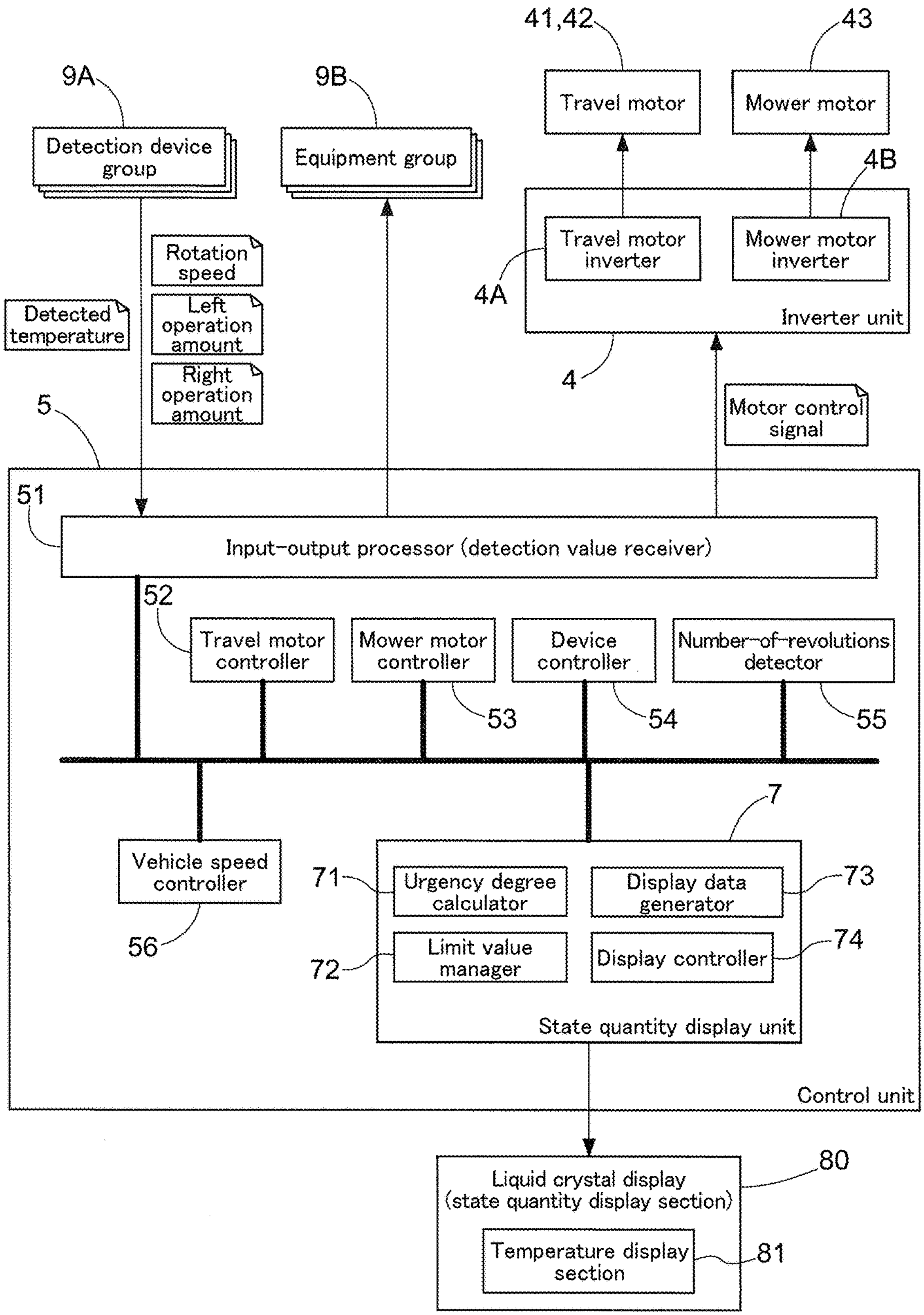
FIG. 5 is a functional block diagram illustrating control function sections of a control unit.

As illustrated in FIG. 5, the control unit 5 includes the following control function sections: an input-output processor 51, a travel motor controller 52, a mower motor controller 53, a device controller 54, a number-of-revolutions detector 55, a vehicle speed controller 56, and a state quantity display unit 7.

The input-output processor 51 is connected to a detection device group 9A, an equipment group 9B, and the inverter unit 4, and serves as a detection value receiver configured to receive information on a detection value of the quantity of the state of any of various devices (or components) which quantity a detection device in the detection device group 9A has detected.

The detection device group 9A includes sensors configured to detect the respective state quantities of two or more components, for example, sensors (such as potentiometers) illustrated in FIG. 3 such as a left travel motor sensor 91 configured to detect the rotation speed of the left travel motor 41, a right travel motor sensor 92 configured to detect the rotation speed of the right travel motor 42, a mower motor sensor 93 configured to detect the rotation speed of the mower motor 43, a left shift sensor 94 configured to detect the amount of operation of the left shift lever **17*a*, and a right shift sensor 95 configured to detect the amount of operation of the right shift lever 17*b*. The detection device group 9A further includes a temperature sensor group 90** including temperature sensors configured to detect the respective temperatures of various components.

The detection device group 9A transmits to the control unit 5 sensor signals related to vehicle speed control, the sensor signals indicating the number of revolutions of the blades 31 (that is, the number of revolutions of the mower motor 43) and the respective amounts of operation of the left and right shift levers **17*a* and 17*b***.

The travel motor controller 52 is configured to generate a motor control signal on the basis of a vehicle speed control signal from the vehicle speed controller 56 and drive the inverter unit 4 to control how the left and right travel motors 41 and 42 are driven independently of each other.

The mower motor controller 53 is configured to generate a motor control signal on the basis of a default number of work revolutions (that is, revolutions for work) and drive the inverter unit 4 to control how the mower motor 43 is driven. The work vehicle may include a member for setting a number of work revolutions, in which case the mower motor controller 53 controls how the mower motor 43 is driven on the basis of the number of work revolutions set with use of the above member.

The device controller 54 is configured to not only manage how the equipment group 9B operate, but also convert, into notification signals, various items of information of which the driver should be notified and transmit the notification signals to notification devices such as a buzzer and a loudspeaker to drive the notification devices.

The number-of-revolutions detector 55 is configured to detect as a work speed (that is, the rate at which the work device is driven) the number of revolutions of the mower motor 43 corresponding to the number of revolutions of the blades 31, on the basis of a number-of-revolutions sensor signal from the mower motor sensor 93 (which is configured to detect the number of revolutions of the mower motor 43).

The vehicle speed controller 56 is configured to calculate the traveling speed of the work vehicle on the basis of sensor signals from the detection device group 9A, and also control how the left and right travel motors 41 and 42 are driven, on the basis of the respective amounts of operation of the left and right shift lever **17*a* and 17*b***.

The state quantity display unit 7 includes an urgency degree calculator 71, a limit value manager 72, a display data generator 73, and a display controller 74 each as a functional section for controlling display of the quantity of any of various states of the work vehicle.

Figure 6:
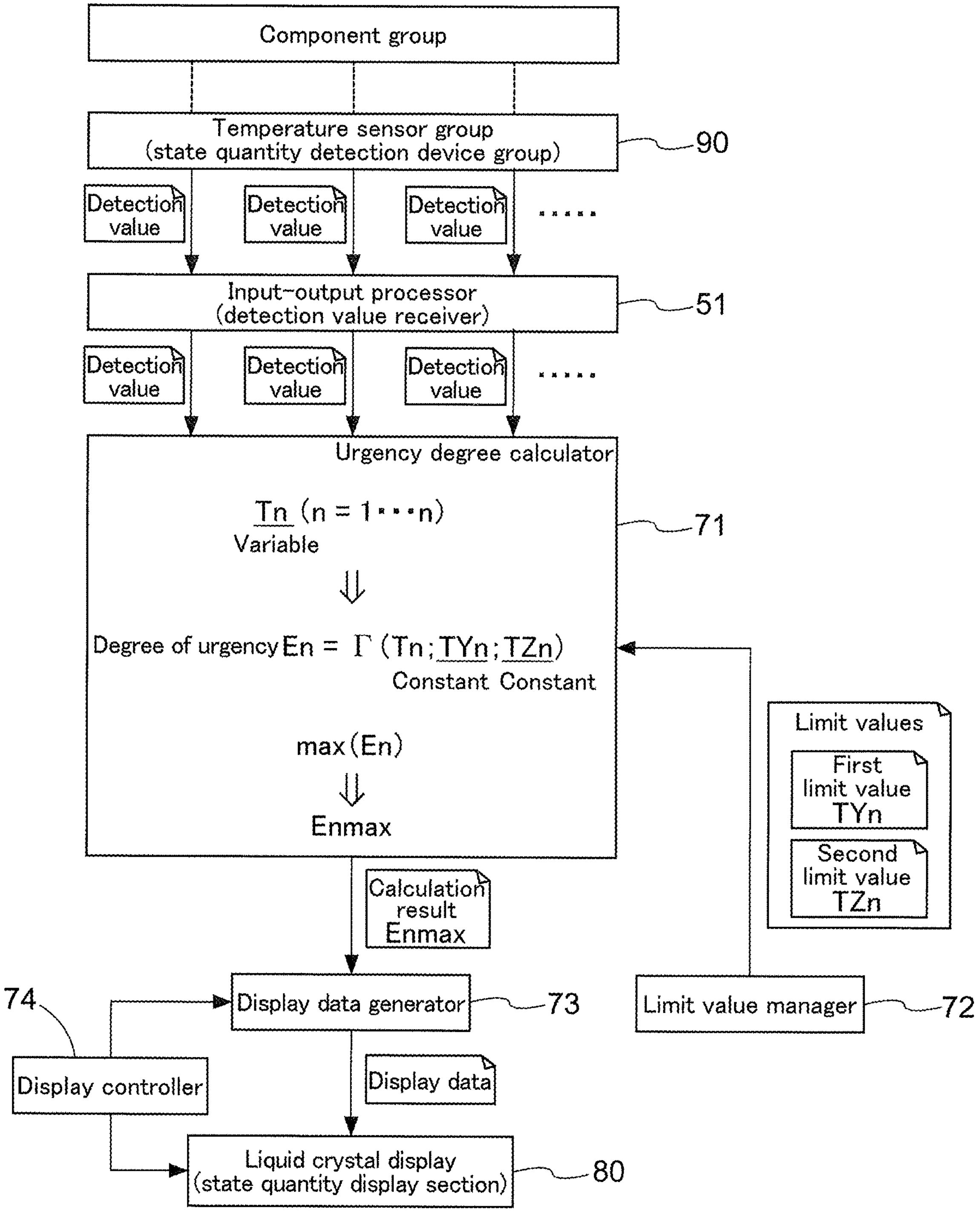
FIG. 6 is a diagram schematically illustrating a flow of data in a system for controlling display of a detection value of a state quantity.

As illustrated in FIG. 6, the urgency degree calculator 71 is configured to normalize the detection value corresponding to each state quantity on the basis of limit values to calculate a notification-urgency degree. Specifically, the urgency degree calculator 71 receives, through the input-output processor 51 (which is an example of the "detection value receiver"), information on detection values of the respective temperatures of individual components (such as the inverter unit 4, the motors 41, 42, and 43, and the cooler), that is, information on the respective temperatures of the individual components as detected by the temperature sensor group 90. The urgency degree calculator 71 also receives information on the corresponding limit values from the limit value manager 72, which manages respective limit values associated with different state quantities. The limit values include a first limit value for a functional limitation of a component and a second limit value for a stop of the component. The urgency degree calculator 71, in other words, calculates the notification-urgency degree En on the basis of, for example, the relational expression below.

$$En=\Gamma(Tn;TYn;TZn),$$

where Tn denotes a variable indicative of the detection value of a component; TYn denotes a constant indicative of the first limit value for the component; and TZn denotes a constant indicative of the second limit value for the component (where n is an integer as a subscript for identification of the component). Γ( ) indicates an urgency degree calculating function or algorithm for normalizing variable ranges and constants that vary for each component. The relational expression may simply be in the form of a lookup table or the like. The urgency degree calculator 71 selects the largest value Enmax among the resulting notification-urgency degrees for the respective components.

The urgency degree calculator 71 provides the display data generator 73 with the result of the calculation, that is, information on Enmax as well as the name of the component corresponding to Enmax and the actual detection value corresponding to Enmax. The display data generator 73 generates, on the basis of the result of the calculation, display data in the form of graphic data as illustrated in FIG. 4 for the temperature display section 81 and transmits the display data to the liquid crystal display 80 (which is an example of the "state quantity display section") for visualization in the form of an information display screen, which shows not only the temperature of the component but also its name. This allows the driver to notice trouble in response to a normally displayed component name suddenly changing to another. The present embodiment is configured such that the display data generator 73 and the liquid crystal display 80 operate under control based on a control instruction from the display controller 74.

The description below deals with a specific example of the urgency degree calculating algorithm.

The urgency degree calculator 71, if the detected temperature is not higher than the first limit value (where the first limit value is 75% of the second limit value), calculates a normalized notification-urgency degree f(n) in a percentage on the basis of the formula below, $$f(n) = (Tn/TYn) * 0.75,$$

and if the detected temperature is between the first and second limit values, calculates a normalized notification-urgency degree g(n) in a percentage on the basis of the formula below, $$g(n) = 0.75 + ((Tn - TYn)/(TZn - TYn)) * 0.25,$$

where Tn denotes the detected temperature of a component; TYn denotes the first limit value for the component; and TZn denotes the second limit value for the component (where n denotes individual components A to E). In other words, f(n) gives a notification-urgency degree En with the detected temperature not higher than the first limit value, whereas g(n) gives En with the detected temperature between the first and second limit values. En is a percentage corresponding to the detected temperature.

For component A, for instance, the urgency degree calculator 71, if the detected temperature TA is not higher than the first limit value, calculates the notification-urgency degree EA on the basis of the formula below, $$f(A) = (TA/TYA) * 0.75,$$

and if TA is between the first and second limit values, calculates EA on the basis of the formula below, $$g(A) = 0.75 + ((TA - TYA)/(TZA - TYA)) * 0.25.$$

The component with the largest En value is most likely to stop functioning (stated differently, the detected temperature is most likely to reach the second limit value). The liquid crystal display 80 displays in the temperature display section 81 the name of that component together with the detection value (or the notification-urgency degree). FIG. 4 illustrates the temperature display section 81 as showing the detection value (that is, the temperature) in the form of an arc-shaped gauge chart extending over an angle of approximately 270 degrees, with the full gauge indicative of En of 100%. This notifies the driver of the detected temperature in relation to the notification-urgency degree, allowing the driver to notice how the detection value (or the notification-urgency degree) is apart from a stop of the function (stated differently, the second limit value). For improved visualization, the liquid crystal display 80, (i) if the notification-urgency degree (that is, the detection value) is not higher than the first limit value, colors the chart with a first color (for example, blue) assigned to a first range from 0% to the first limit value, (ii) if the notification-urgency degree (that is, the detection value) is between the first and second limit values, colors the chart with a second color (for example, yellow) assigned to a second range from the first limit value to the second limit value, and optionally (iii) if the notification-urgency degree is, for example, 98% or higher, colors the chart with a special color (for example, red) to warn of a stop of the function (that is, a stop of the work vehicle). The liquid crystal display 80 may, if the notification-urgency degree is between the first and second limit values, either (i) color a first portion of the chart with the first color which first portion corresponds to the first range and a second portion of the chart with the second color which second portion corresponds to the second range or (ii) color the entire chart with the second color. The latter arrangement allows the driver to simply check the color of the chart to recognize whether the current temperature is not higher than the first limit value, between the first and second limit values, or optionally close to the second limit value. The chart may have solid colors or colors with vertical gradation, with lighter or darker colors toward above (that is, for a higher value) or below (that is, for a lower value).

Alternative Embodiments (1) The embodiment described above is an electric mower as a work vehicle. The present invention is also applicable to, for example, mowers drivable by an internal combustion engine, work vehicles other than mowers such as agricultural work vehicles, earthmoving work vehicles, and construction work vehicles, and utility vehicles.

(2) The embodiment described above involves temperature as a state quantity. The state quantity may alternatively be, for example, the number of revolutions, a load, a speed, or noise.

(3) The embodiment described above involves first and second limit values on the increase side of the state quantity (temperature). The first and second limit values may alternatively be on the decrease side (that is, for values lower than a reference).

(4) The embodiment described above is configured such that the temperature display section 81 (which is an example of the "state quantity display section") is in the form of an arc-shaped gauge chart. The temperature display section 81 may alternatively be in another graphic form such as a bar chart or a pie chart or even in a form other than graphics.

(5) FIGS. 5 and 6 each show rectangles each indicative of respective functional blocks. The arrangement of the functional blocks is merely for the purpose of description: Two or more separate functional blocks may be combined into a single functional block, whereas a single functional block may be divided into two or more separate functional blocks.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The present invention is applicable to a state quantity display system for displaying the quantity of any of various states of a work vehicle and to any of various work vehicles including such a state quantity display system.

The invention claimed is:

1. A state quantity display system for displaying a quantity of a state of a work vehicle, the state quantity display system comprising:

a control unit, the control unit comprising:

a detection value receiver configured to receive information on a detection value of a state quantity of each of a plurality of components of a work vehicle;

a limit value manager configured to manage at least one limit value associated with the state quantity;

an urgency degree calculator configured to normalize the detection value based on the at least one limit value to calculate a notification-urgency degree; and a display controller configured to select from among the detection values a first detection value for which the notification-urgency degree is highest and cause a state quantity display section to display the first detection value, wherein:

the at least one limit value comprises a first limit value for a functional limitation of the component and a second limit value for a stop of the component, the urgency degree calculator calculates the notification-urgency degree with use of a function involving the detection value as a variable and the first limit value and the second limit value as constants, and the state quantity display section is configured to display at least the detection value as a numerical value and a name of the component corresponding to the detection value.

2. The state quantity display system according to claim 1, wherein:

the display controller causes the state quantity display section to display the first detection value in a graphic form indicative of a relation between the detection value and the first limit value and a relation between the detection value and a second limit value.

3. The state quantity display system according to claim 2, wherein:

the graphic form is a gauge chart comprising a first range and a second range, the first range extending to the first limit value and having a first color, the second range extending from the first limit value to the second limit value and having a second color different from the first color.

4. The state quantity display system according to claim 1, wherein:

the plurality of components comprises at least two of a battery, a motor, an inverter, a cooler, and a hydraulic device, and the state quantity is a temperature of each of the at least two components.

5. A work vehicle, comprising:

a state quantity display system according to claim 1.

6. The state quantity display system according to claim 1, wherein:

the display controller is disposed at a side of a driver's seat provided in the work vehicle.

7. The state quantity display system according to claim 1, further comprising:

an indicator lamp, wherein the indicator lamp is configured to carry out indication when the notification-urgency degree meets a predetermined condition.

* * * * *